E. A. DIETERICH.
AUXILIARY ACTUATING DEVICE FOR THE BRAKE MECHANISM OF AN AUTOMOBILE.
APPLICATION FILED NOV. 19, 1913. RENEWED JAN. 5, 1915.
1,131,485.
Patented Mar. 9, 1915.
7 SHEETS—SHEET 1.
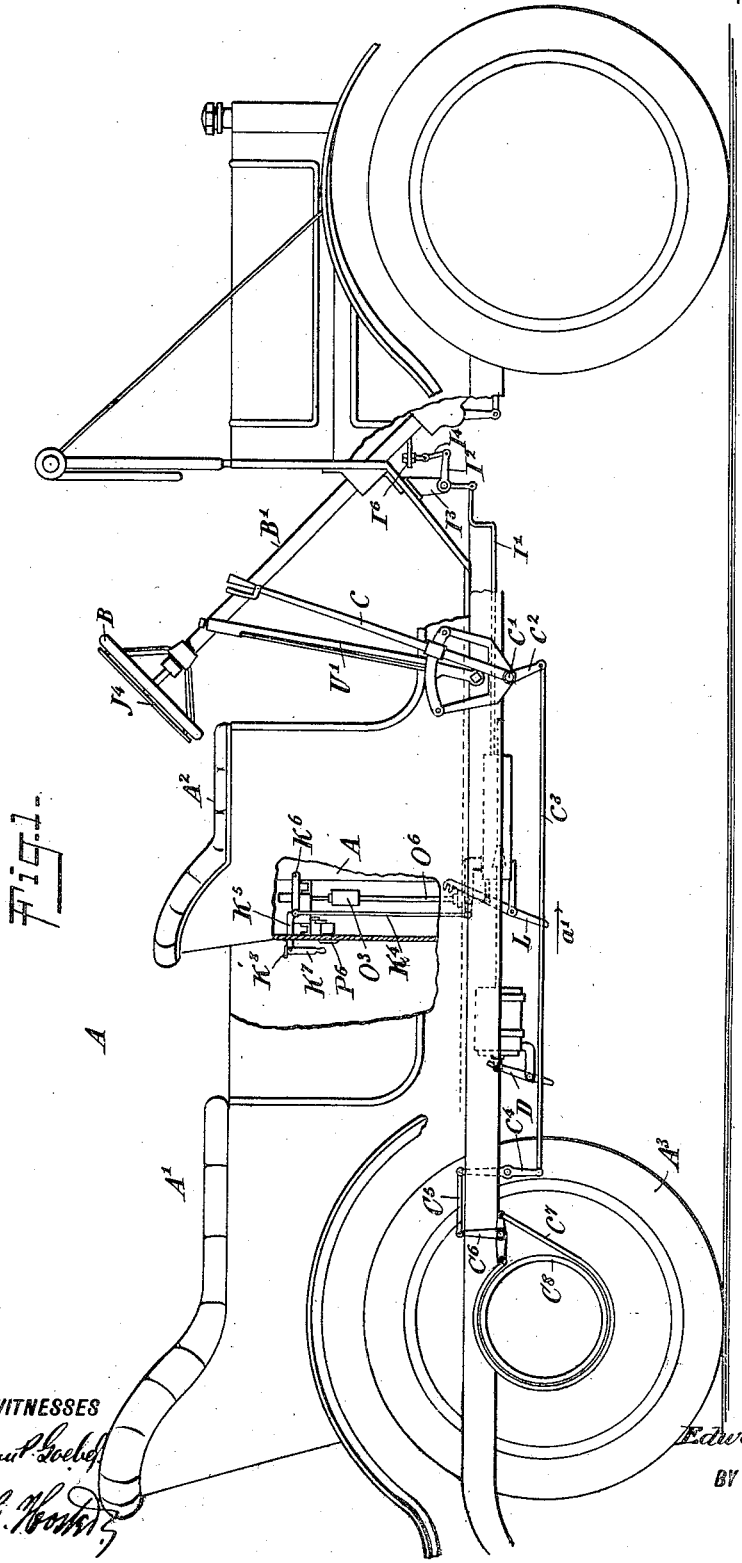
WITNESSES
INVENTOR
Edward A. Dieterich
BY
ATTORNEYS

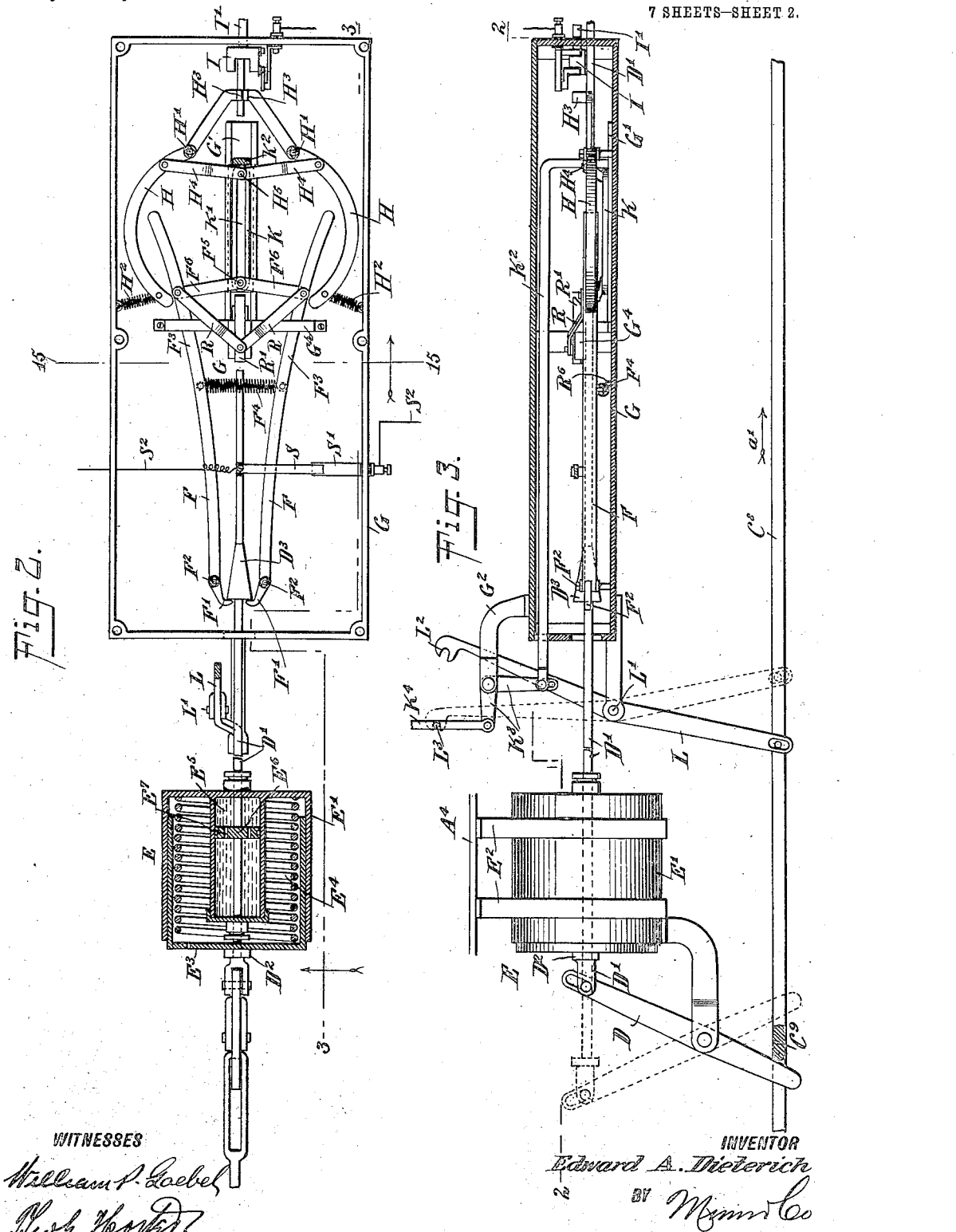

E. A. DIETERICH.
AUXILIARY ACTUATING DEVICE FOR THE BRAKE MECHANISM OF AN AUTOMOBILE.
APPLICATION FILED NOV. 19, 1913. RENEWED JAN. 5, 1915.
1,131,485.
Patented Mar. 9, 1915.
7 SHEETS—SHEET 3.
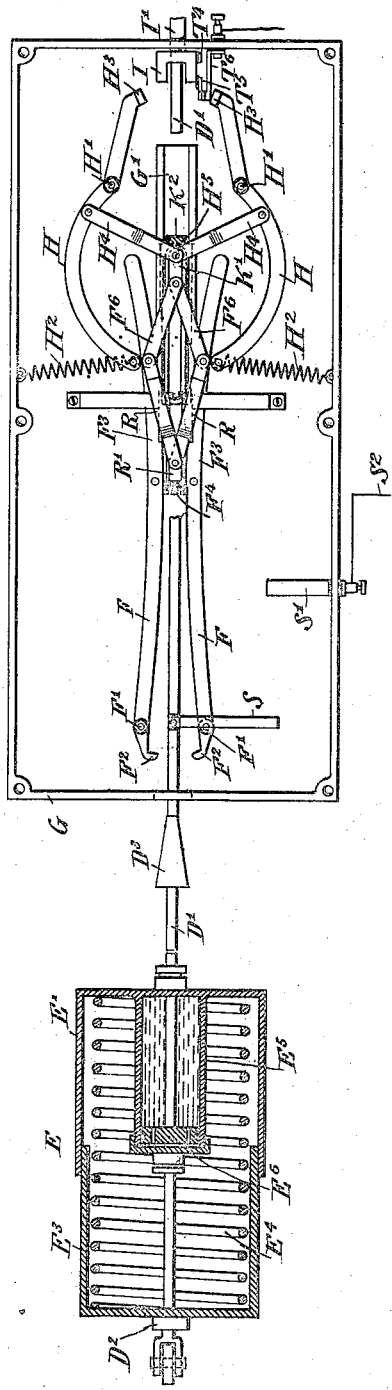
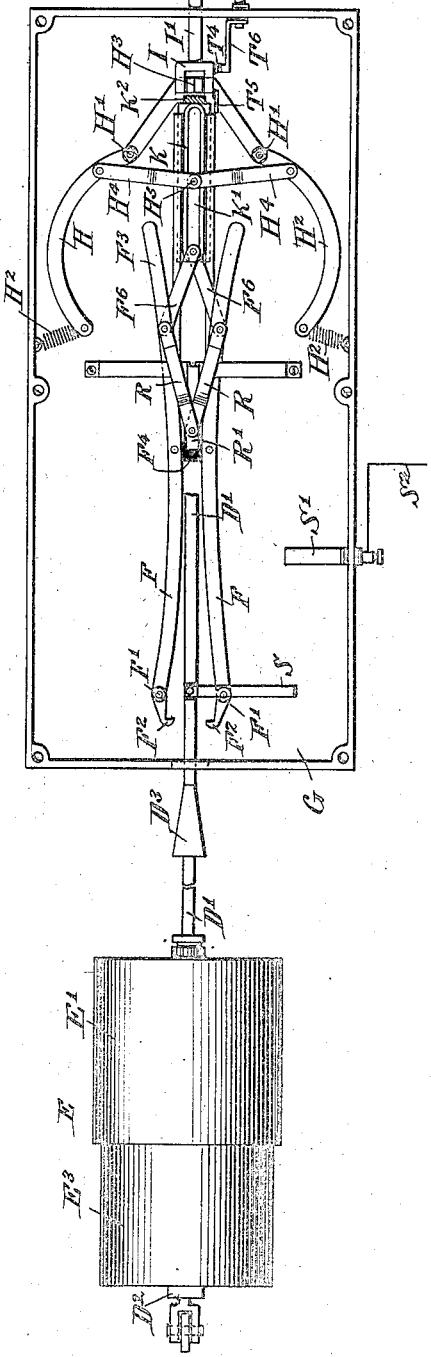
WITNESSES
INVENTOR
Edward A. Dieterich
BY
ATTORNEYS

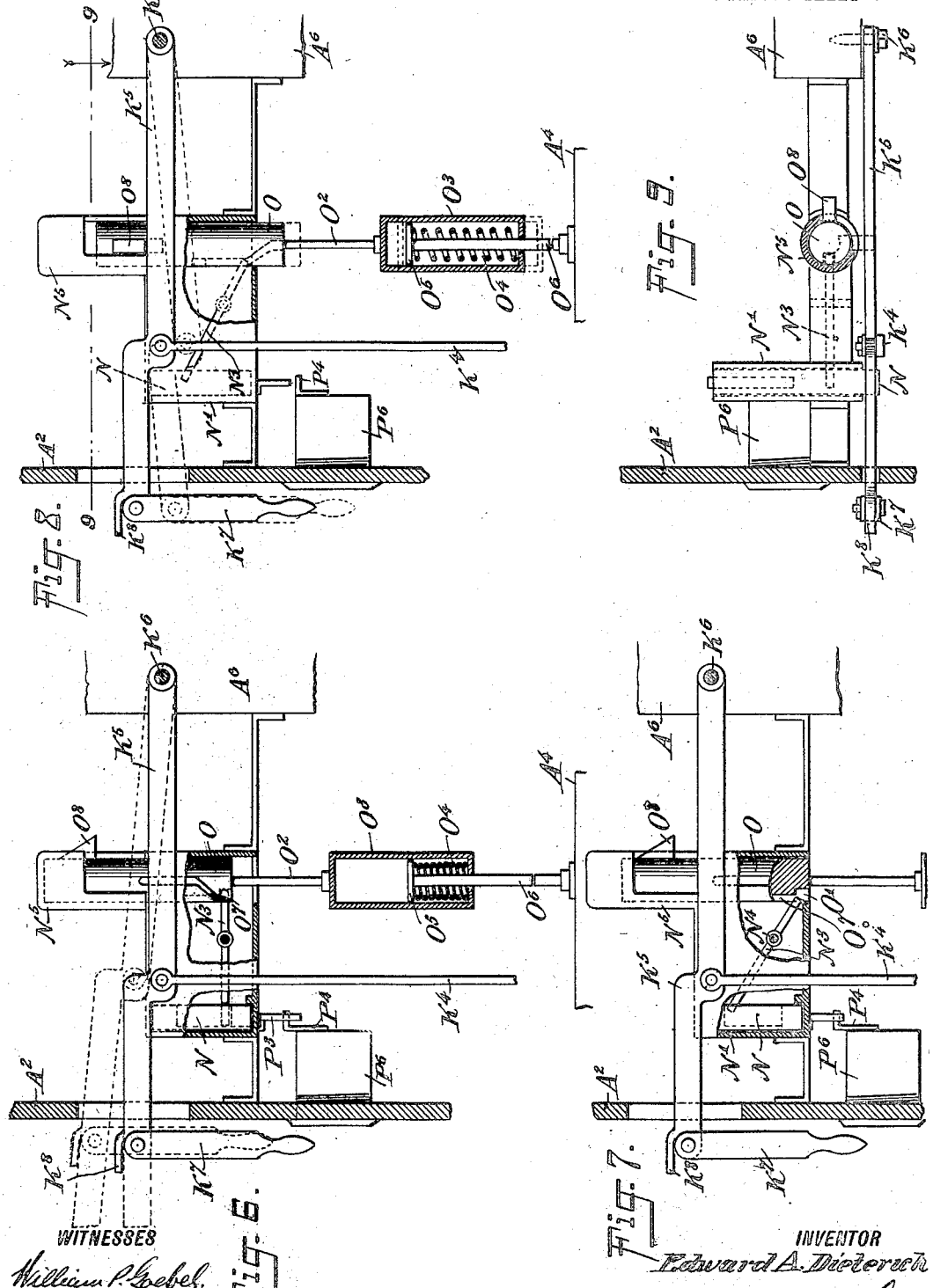

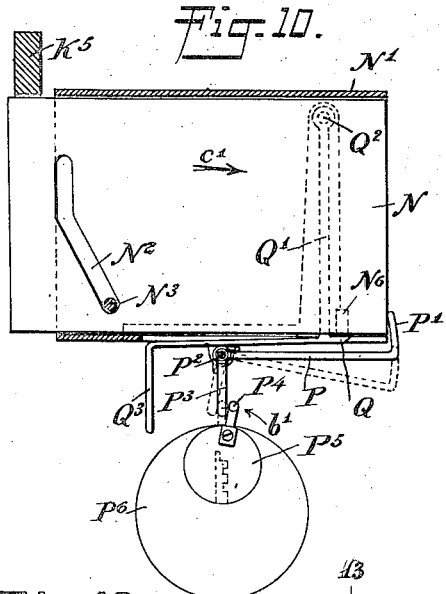
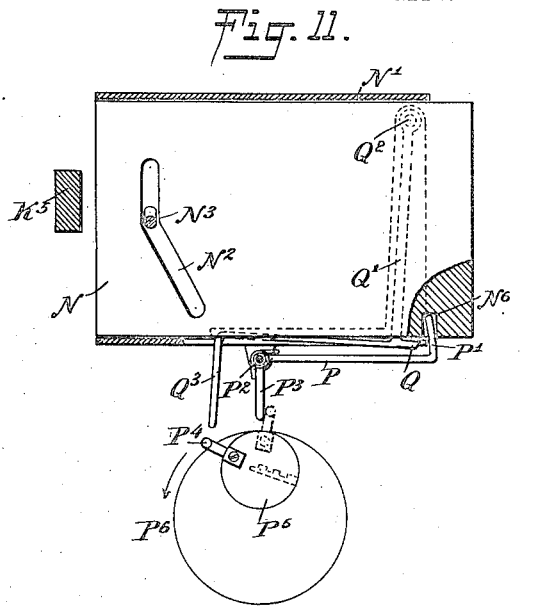
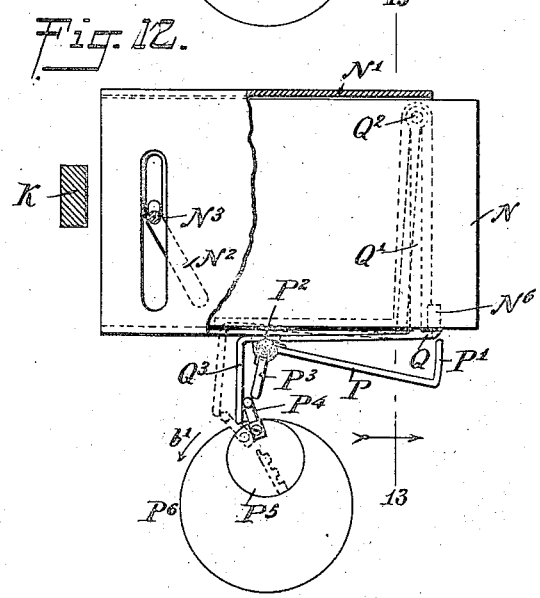
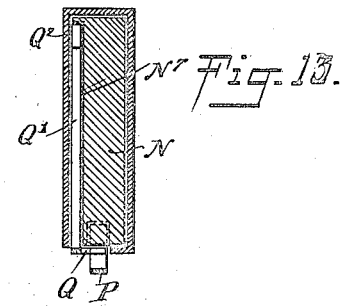

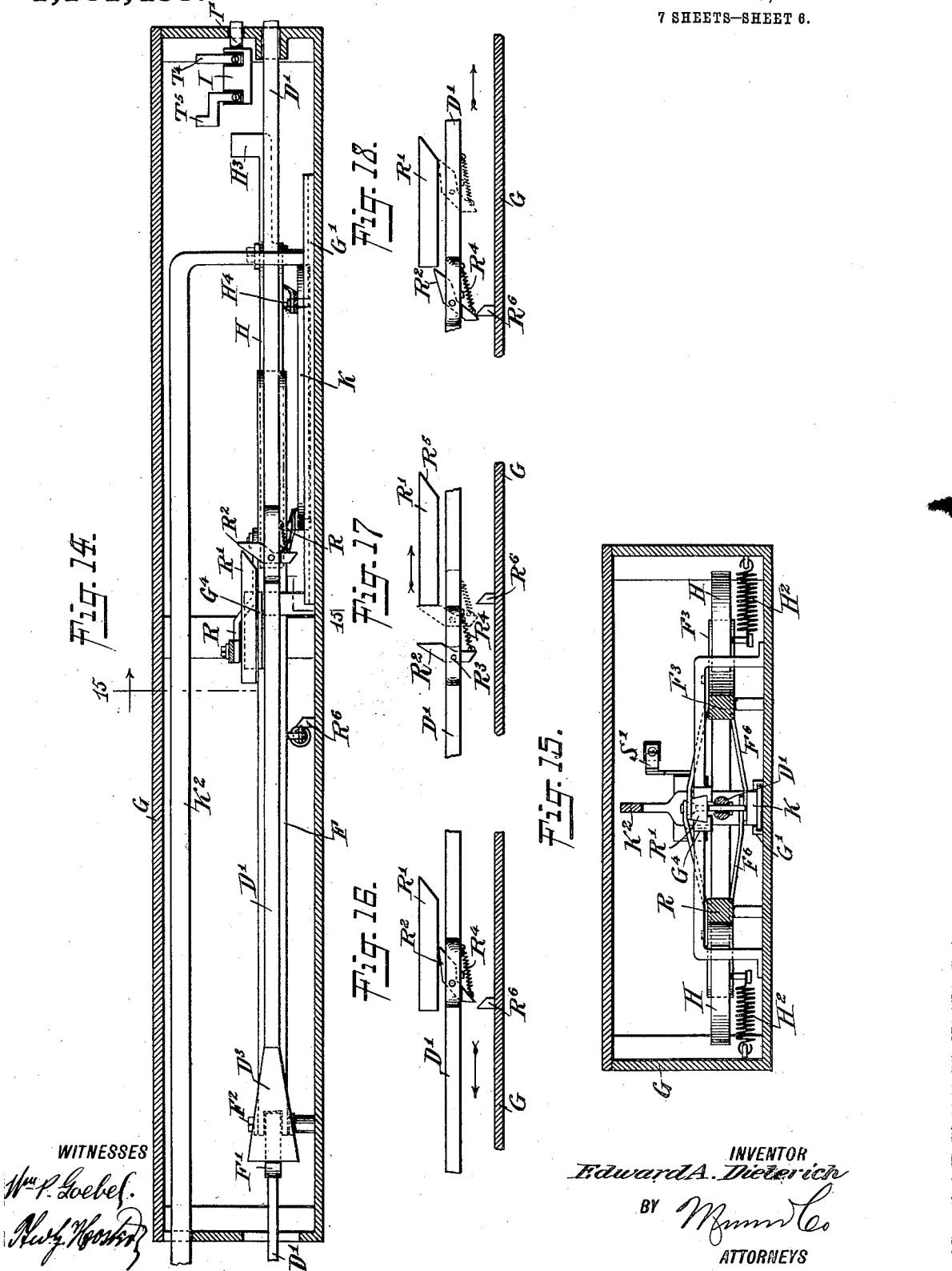

E. A. DIETERICH.
AUXILIARY ACTUATING DEVICE FOR THE BRAKE MECHANISM OF AN AUTOMOBILE.
APPLICATION FILED NOV. 19, 1913. RENEWED JAN. 5, 1915.
1,131,485.
Patented Mar. 9, 1915.
7 SHEETS—SHEET 7.
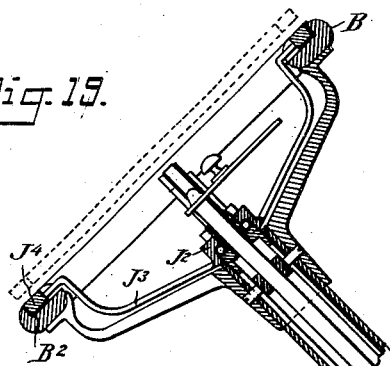
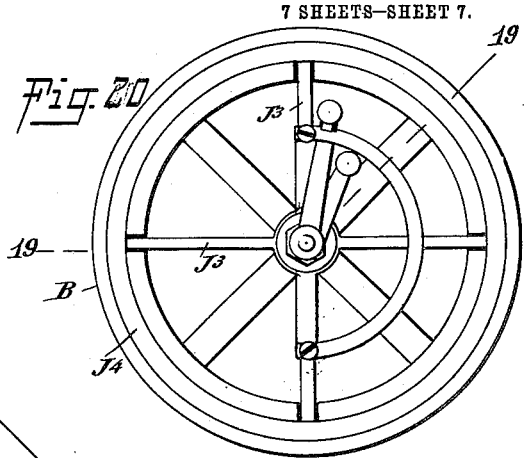
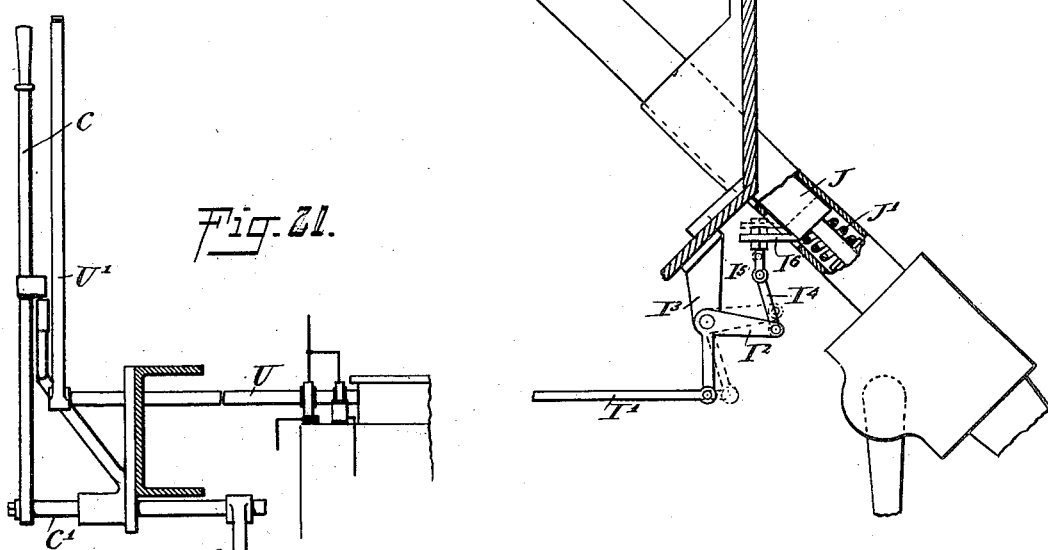
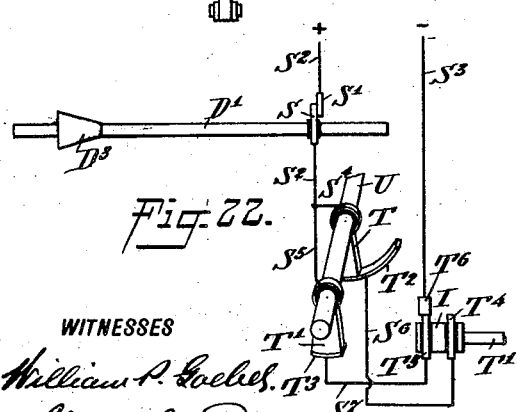
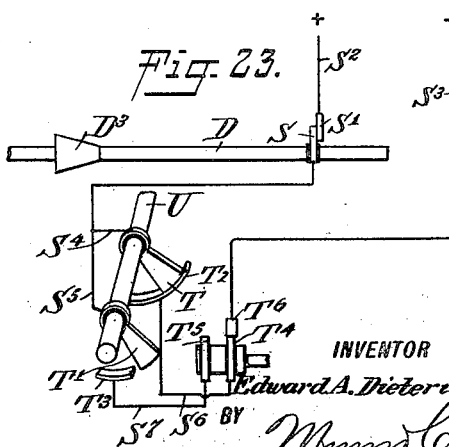
WITNESSES
INVENTOR
Edward A. Dieterick
BY
ATTORNEYS

UNITED STATES PATENT OFFICE.

EDWARD A. DIETERICH, OF NEW YORK, N. Y.

AUXILIARY ACTUATING DEVICE FOR THE BRAKE MECHANISM OF AN AUTOMOBILE.

1,131,485.  Specification of Letters Patent.  Patented Mar. 9, 1915.

Application filed November 19, 1913, Serial No. 801,957. Renewed January 5, 1915. Serial No. 667.

*To all whom it may concern:*

Be it known that I, EDWARD A. DIETERICH, a citizen of the United States, and a resident of the city of New York, borough of the Bronx, in the county of Bronx and State of New York, have invented a new and Improved Auxiliary Actuating Device for the Brake Mechanism of an Automobile, of which the following is a full, clear, and exact description.

The object of the invention is to provide a new and improved auxiliary actuating device for the brake mechanism of an automobile, arranged to permit an occupant of a rear seat to apply the brakes in case the chauffeur is absent or the chauffeur fails or is incapacitated to apply the brakes, to stop the motor on manipulating the auxiliary actuating device, to prevent the occupant from applying the brakes as long as the chauffeur is properly attending to his duties, and to allow the occupant to apply the brakes in case of an emergency.

In order to accomplish the desired result, use is made of a manually-controlled mechanism connected with the regular brake mechanism of the automobile and having operating means extending within reach of the occupant of a rear seat of the automobile.

A practical embodiment of the invention is represented in the accompanying drawings forming a part of this specification in which similar characters of reference indicate corresponding parts in all the views.

Figure 1 is a side elevation of an automobile provided with the auxiliary actuating device for the brake mechanism, parts being broken out; Fig. 2 is an enlarged sectional plan view of the auxiliary actuating device for the brake mechanism of an automobile, the section being on the line 2—2 of Fig. 3; Fig. 3 is a sectional side elevation of the same on the line 3—3 of Fig. 2; Fig. 4 is a sectional plan view of the same with the parts in position after the brake is applied by the auxiliary actuating mechanism; Fig. 5 is a similar view of the same and showing the parts in position after the brakes are applied by an emergency stop of the occupant in a rear seat; Fig. 6 is an enlarged sectional side elevation of the controlling device for the auxiliary actuating device with the parts in normal position; Fig. 7 is a like view of the same with the parts in a different position; Fig. 8 is a similar view of the same with the parts in another position; Fig. 9 is a sectional plan view of the same on the line 9—9 of Fig. 8; Fig. 10 is an enlarged cross section of the locking mechanism for the emergency application with the main bolt in locked position; Fig. 11 is a similar view of the same with the bolt in retracted and locked position; Fig. 12 is a similar view of the same with the bolt retracted and unlocked; Fig. 13 is a sectional elevation of the same on the line 13—13 of Fig. 12; Fig. 14 is an enlarged sectional side elevation of part of the auxiliary actuating device; Fig. 15 is a cross section of the same on the line 15—15 of Fig. 14; Fig. 16 is an enlarged side elevation of a portion of the resetting device; Fig. 17 is a similar view of the same with the parts in a different position; Fig. 18 is a like view of the same with the parts in another position; Fig. 19 is an enlarged side elevation with parts of the steering wheel in section, on the line 19—19 of Fig. 20, and showing part of the locking device for locking the auxiliary actuating mechanism against movement by an occupant in a rear seat; Fig. 20 is a face view of the steering wheel and the parts carried thereby; Fig. 21 is a cross section of part of the chassis of the automobile and showing the means for maintaining an electric circuit on locking or unlocking the auxiliary actuating device on the part of the chauffeur; Fig. 22 is a diagrammatic view of the switch mechanism for breaking the circuit on actuating the auxiliary actuating device; and Fig. 23 is a similar view of the same with the parts in a different position.

The automobile A, illustrated in Fig. 1, is provided with rear seats A', for one or more passengers, and front seats $A^2$, one of which is occupied by the chauffeur controlling the steering wheel B of the steering device as well as the usual other controlling devices of an automobile, including the emergency brake lever C held on a shaft C' provided with an arm $C^2$ connected by a rod $C^3$ with a lever $C^4$ pivotally connected by a link $C^5$ with a lever $C^6$ connected with the ends of the brake band $C^7$ operating in conjunction with the preipheral face of a brake wheel $C^8$ on the shaft of the rear or drive wheels $A^3$ of the automobile. This brake mechanism is of usual construction and the brake band $C^7$ is also controlled by the usual foot pedal under the control of the foot of the chauffeur seated on the seat $A^2$.

It is understood when the emergency brake lever C is moved rearwardly the rod $C^3$ is moved forwardly in the direction of the arrow $a'$ to cause the brake band $C^7$ to brake the automobile and thus eventually bring the same to a standstill. The auxiliary actuating device which forms my invention is shown connected with the rod $C^3$ although the said auxiliary actuating device may be connected with other parts of the usual or regular brake mechanism to accomplish the same result as hereinafter more fully explained. The rod $C^3$ of the usual brake mechanism is provided with a shoulder $C^9$ (see Fig. 3) engaged by the lower end of a lever D pivotally connected at its upper end with a rod $D'$ mounted to slide lengthwise immediately below the bottom of the body of the automobile A, and the said rod $D'$ is normally locked in forward position and when released is moved rearwardly by a spring device E so that a swinging motion is given to the lever D and the rod $C^3$ is moved forward to apply the brake with a view to bring the automobile to a standstill.

The spring device E consists of an outer cylinder $E'$ fastened by brackets $E^2$ to the under side of the bottom $A^4$ of the body of the automobile A, and in the said cylinder $E'$ is mounted to slide a second cylinder $E^3$ and between the cylinder is interposed a spring $E^4$ to push the cylinder $E^3$ rearwardly against a collar $D^2$ secured on the rod $D'$. In order to prevent a sudden rearward movement of the rod $D'$ by the action of the spring device E and after the rod $D'$ is released, use is made of a retarding device consisting essentially of a cylinder $E^5$ filled with oil, glycerin or other suitable liquid and attached to the head of the cylinder $E'$. Within the cylinder $E^5$ is arranged a piston $E^6$ secured on the rod $D'$ and provided with apertures $E^7$ to permit the liquid to flow from one side of the piston $E^6$ to the other side thereof at the time the rod $D'$ is released and moves rearwardly and with it the piston $E^6$ (see Figs. 2 and 4).

In order to hold the rod $D'$ in locked forward position, the following arrangement is made: On the rod $D'$ is secured or formed a conically-shaped collar $D^3$ engaged at its rear or base end by hooks $F'$ of a pair of retaining levers F fulcrumed at $F^2$ in a box G secured to the under side of the bottom $A^4$ of the automobile body. The levers F are provided with forward curved extension arms $F^3$ between which is interposed a spring $F^4$ to normally hold the arms $F^3$ in outermost position and the hooks $F'$ in engagement with the base of the collar $D^3$, as plainly shown in Fig. 2. The arms $E^8$ of the retaining levers F are adapted to be engaged by opening levers H fulcrumed at $H'$ in the box G and pressed on at their rear ends by springs $H^2$ to normally hold the said levers H in outermost position, as illustrated in Figs. 2 and 5. The forward ends of the opening levers H are provided with vertically-extending lugs $H^3$ adapted to be engaged by a fork-shaped locking member I held on the rear end of a rod $I'$ extending through the forward end of the casing G. The rod $I'$ of the locking member I is pivotally connected at its forward end with a bell crank lever $I^2$ pivoted on a bracket $I^3$ fastened to the under side of the supports $A^5$ for the steering staff $B'$ carrying the steering wheel B, as plainly shown in Figs. 1 and 19. The bell crank lever $I^2$ is pivotally connected by a link $I^4$ with a stud $I^5$ secured on an arm $I^6$ attached to or forming part of the lower end of a sleeve J mounted to slide lengthwise in the staff $B'$. The sleeve J is pressed in an upward direction by a spring $J'$ and the upper end of the said sleeve J is engaged by a hub $J^2$ from which extend spokes $J^3$ carrying a rim $J^4$ forming part of the controlling device for the locking member I. The rim $J^4$ is adapted to be seated in an annular recess or seat $B^2$ formed in the rim of the steering wheel B, but the said controlling rim $J^4$ is normally held a distance above the rim of the wheel B by the action of the spring $J''$. When the sleeve J is in this normal uppermost position, the locking member I is in withdrawn position as shown in Figs. 2 and 4, that is, is out of engagement with the lugs $H^3$ to allow the levers H to swing inward toward each other with a view to actuate the retaining levers F to disengage the hooks $F'$ from the collar $D^3$ with a view to release the rod $D'$. When the chauffeur has hold of the steering wheel B he presses the rim $J^4$ downward into the recess $B^2$ whereby a downward sliding movement is given to the sleeve J which by the connection above described causes the locking member I to move rearwardly into engagement with the lugs $H^3$ to lock the levers H against inward swinging movement as long as the chauffeur holds the rim $J^4$ in depressed position. It is understood that as soon as the chauffeur releases the rim $J^4$ the spring $J'$ forces the sleeve J and the rim $J^4$ upward so that the locking member I moves forwardly into retracted position, that is, out of engagement with the lugs $H^3$.

In order to swing the opening levers H inwardly at the time the locking member I is in the retracted position shown in Figs. 2 and 4, the following arrangement is made: Links $H^4$ are pivotally connected with the levers H and the links $H^4$ are pivotally connected with each other by a pivot $H^5$ common to both links, and this pivot $H^5$ extends into a longitudinally-extending slot K' formed in a slide K mounted to slide in a suitable bearing G' attached to or forming part of the bottom of the box G. To the slide K is secured a rearwardly-extending arm $K^2$ pivotally connected at its rear end with a bell crank lever $K^3$ fulcrumed on a bracket $G^2$ attached to the top of the box G. The bell crank lever $K^3$ is connected by a link $K^4$ with an operating lever $K^5$ fulcrumed at $K^6$ on a suitable support $A^6$ arranged at the back of the frame seat $A^2$, as plainly indicated in Fig. 1 (see also Figs. 6, 7, 8 and 9). The free end of the lever $K^5$ is provided with a pivoted handle $K^7$ normally hanging downward but within convenient reach of a passenger seated on the rear seat A' to permit the said passenger to swing the handle $K^7$ into horizontal position against a stop lug $K^8$, to permit the passenger to then swing the lever $K^5$ upwardly with a view to exert an upward pull on the link $K^4$ which by the bell crank lever $K^3$ imparts a rearward movement to the rod $K^2$ and the slide K. When this takes place the pivot $H^5$ of the links $H^4$ is moved rearwardly by the slide K to cause the levers H to swing inward provided the said levers are unlocked by the locking member I. The inward swinging movement of the levers H causes a like swinging movement of the arms $F^3$ of the retaining levers F so that the hooks F' thereof disengage the collar $D^3$ thus unlocking the rod D'. When this takes place the spring $E^4$ forces the rod D' rearwardly whereby a swinging motion is given to the lever D and a forward movement to the rod $C^3$, to apply the brake as previously explained.

It will be noticed that as long as the chauffeur keeps the rim $J^4$ pressed downward into the recess $B^2$ of the steering wheel B, the locking member I engages the lugs $H^3$ and locks the lever H against movement and consequently the passenger in the rear seat A' cannot impart a swinging motion to the lever $K^5$ owing to the fact that the slide K is held locked against rearward movement by the links $H^4$ and consequently the connection between the slide K and the lever $K^5$ is held against movement to prevent movement of the lever $K^5$. When, however, the chauffeur leaves the seat or releases the grip on the rim $J^4$ and the latter moves upward by the action of the spring J' then the locking member I disengages the lugs $H^3$ whereby the opening levers H are unlocked and if a passenger now swings the lever $K^5$ upward, as previously explained, then the levers H are moved inward and cause the levers F to release the collar $D^3$ of the rod D'.

From the foregoing it will be seen that a passenger on the rear seat A' can apply the brakes in case the chauffeur releases the rim $J^4$ for any reason whatever. Thus if the chauffeur becomes incapacitated to act properly then the passenger in the rear of the car can apply the brake and bring the automobile to a stop. In case the chauffeur is absent and the automobile should start on a down grade the passenger in the rear of the car can apply the brake to prevent the automobile from running wild down the grade.

When the chauffeur applies the brake on swinging the brake lever C rearwardly then the auxiliary actuating device above described is locked against movement and for this purpose use is made of a lever L (see Figs. 2 and 3) pivoted at L' on the casing G and pivotally connected with the rod $C^3$. The upper end of the lever L is provided with a fork $L^2$ adapted to engage a pin $L^3$ projecting transversely from the link $K^4$. Normally the fork $L^2$ is out of engagement with the pin $L^3$ but when the lever C is moved rearwardly and the rod $C^3$ is drawn forwardly in the direction of the arrow a', as previously described, then a swinging motion is given to the lever L to engage the fork $L^2$ with the pin $L^3$ to lock the auxiliary actuating device against movement and consequently the passenger on the rear seat A' cannot manipulate the lever $K^5$.

In case of an emergency the passenger in the rear seat A' can stop the brake irrespective of whether the locking member I is in or out of engagement with the lugs $H^3$, and for this purpose the following arrangement is made: The lever $K^5$ is held against downward movement by a bolt N (see Figs. 6 to 13) and this bolt is mounted to slide transversely in a suitable casing N' attached to the back of the front seat $A^2$. The bolt N is provided with a slot or groove $N^2$ inclined in the lower portion and disposed vertically in its upper portion, as plainly shown in Figs. 10 and 11, and this slot $N^2$ is normally engaged at its bottom by one end of a lever $N^3$ fulcrumed at $N^4$ on the casing N'. The lever $N^3$ projects into a notch O' of a bolt O mounted to slide in a suitable bearing $N^5$ forming part of the casing N'. The bolt O is provided with a downwardly-extending stem $O^2$ attached to a casing $O^3$ on the bottom of which rests a spring $O^4$ abutting with its upper end on a collar $O^5$ extending within the cylinder $O^3$ and held on the upper end of a rod $O^6$ fixed to the bottom $A^4$ of the automobile body (see Figs. 1, 6, 7 and 8). The spring $O^4$ is normally under tension, as indicated in Fig. 6.

The bolt N is normally in shot out position so that its outer end extends under the lever $K^5$ to prevent downward swinging motion of the same, and the bolt N is held locked in this shot out position by the angular end P' of a spring-pressed lever P fulcrumed at $P^2$ on the casing N' and having a downwardly-extending arm P³ adapted to be engaged by a lug P⁴ projecting from the barrel P⁵ of an ordinary Yale or other lock P⁶ mounted on the back of the front seat A² so that a passenger on the rear seat A' can insert the proper key in the lock P⁶ to turn the barrel in the direction of the arrow b' (see Fig. 10), with a view to cause the lug P⁴ to impart a swinging motion to the arm P³ of the lever P with a view to move the angular arm P' out of engagement with the rear end of the bolt N. When this takes place the bolt N is unlocked and the tension of the spring exerted on the casing O³ causes the bolt O to move downward whereby a swinging motion is given to the lever N³ to impart a sliding motion to the bolt N in the direction of the arrow a' to move the bolt N out from under the lever K⁵. The bolt O is provided on its peripheral face with a spiral groove O⁷ extending from the notch O' in an upward and sidewise direction and hence when the bolt O reaches the position shown in Fig. 7 the lower end of the lever N³ passes into the spiral groove O⁷ whereby the bolt O is given a quarter turn during its further downward movement caused by the action of the spring O⁴. The upper end of the bolt O is provided with a shoulder O⁸ normally standing out of the path of the lever K⁵, as indicated in Figs. 6 and 7, but moved into the path of the lever K⁵ and in engagement with the top thereof during the final downward and turning movement of the bolt O so that the shoulder O⁸ imparts a downward swinging motion to the lever K⁵ (see dotted lines in Fig. 8). This downward movement of the lever K⁵ causes a corresponding downward movement of the link K⁴ whereby a swinging motion is given to the bell crank lever K³ which in turn imparts a forward sliding motion to the slide K.

The groove K' of the slide K is engaged by a pin F⁵ pivotally connecting the inner ends of links F⁶ with each other (see Figs. 2, 3, 4 and 5), the said links F⁶ being connected with the arms F³ of the levers F. By reference to Fig. 2 it will be noticed that when the slide K is moved forward the pivot F⁵ is carried along and in doing so the links F⁶ impart an inward swinging motion to the arms F³ so that the hooks F' disengage the base of the collar D³. When this takes place the rod D' is released and is now moved rearwardly by the action of the spring device E to cause the lever D to impart a forward movement to the rod C³ to apply the brake. It will be noticed that in this case the levers H whether locked or unlocked are not used for applying the brake but the brake is automatically applied as soon as the passenger on the rear seat A' turns the barrel P⁵ of the lock P⁶. The upper portion of the groove O⁷ is straight to allow the bolt O to slide down the desired distance after the shoulder O⁸ has engaged the lever K⁵ without further turning of the said bolt O.

In order to hold the bolt N in retracted position the following arrangement is made: In the under side of the bolt N is formed a recess N⁶ adapted to be engaged by the angular arm P' of the spring-pressed lever P (see Fig. 7). The recess N⁶ is normally closed by a flange Q held on the lower end of an arm Q' fulcrumed at Q² on the bolt N and extending within a recess N⁷ in the rear face thereof, as plainly indicated in Fig. 13. The arm Q' is provided at its lower end with an angular extension Q³ extending in the path of the lug P⁴ and in front of the arm P³ so that after the lug P⁴ has imparted a swinging motion to the lever P³ then on further turning of the barrel P⁵ the lug P⁴ engages the angular arm Q³ (see Fig. 12) whereby the arm Q' is caused to swing into the position shown in Fig. 11 thus moving the flange Q out from under the recess N⁶ to allow the angular arm P' of the spring-pressed lever P to pass into the said recess N⁶ and thus lock the bolt N in retracted position. When it is desired to reset the emergency auxiliary actuating device just described the operator turns the barrel P⁵ until the lug P⁴ strikes the arm P³ to swing the lever P downward and thereby disengage the arm P' from the recess N⁶ to unlock the bolt N. At the same time the operator imparts an upward swinging motion to the lever K⁵ so that the bolt O is moved and the lever N³ imparts an outward sliding movement to the bolt N in the inverse direction of the arrow a', and the said lever N³ on entering the spiral groove O⁷ turns the bolt O to disengage the shoulder O⁸ from the lever K⁵ at the time the lever N³ reaches the notch O'. It is understood that when the bolt N is in shot-out position, as shown in Fig. 10, the arm Q³ is completely out of the path of the lug P⁴, but when the bolt N is retracted, as previously explained, then the said arm Q³ moves into the path of the lug P⁴ so that the latter can actuate the arm Q', as above explained, for the flange Q to uncover the notch N⁶.

In order to reset the levers F relative to the collar D³ after the auxiliary actuating device or the emergency actuating device has been used, the following arrangement is made: The chauffeur swings the lever C forward so that a return movement is given to the rod C³ to open the brake band C⁷ and during this return movement of the rod C³ it imparts a swinging motion to the lever D to return the latter to its former position, the lever D during this movement moving the rod D' forward to place the spring device under tension. The levers F during the return movement of the rod D' are moved back into closed position, and for this purpose the arm $P^3$ of the levers F are pivotally connected by links R (see Figs. 2, 3, 4, 5, 14, 15, 16, 17 and 18) with a slide R′ mounted to slide lengthwise in a suitable bearing $G^4$ arranged in the casing G. The slide R′ is adapted to be engaged by a catch $R^2$ pivoted at $R^3$ on the rod D′ and pressed on by a spring $R^4$ to normally hold the catch $R^4$ in vertical position in the path of the slide R′. When the parts are in normal position, as shown in Fig. 14, the catch $R^2$ extends in front of the beveled forward end $R^5$ of the slide R′, and when the rod D′ is released and moves rearwardly, as previously explained, then the spring-pressed catch $R^2$ in moving with the rod D′ passes under the slide R′ (see Fig. 16) to finally leave the rear end of the slide R′ and return to normal vertical position, as shown in Fig. 17. When the rod D′ in resetting is moved forwardly then the catch $R^2$ engages the slide R′ (see dotted lines in Fig. 17) and moves the slide R′ forward whereby the links R impart an outward swinging movement to the arms $F^3$ to swing the hooks F′ inwardly. When this has been accomplished the bottom of the catch $R^2$ engages a fixed stop $R^6$ held on the casing G so that a swinging motion is now given to the catch $R^2$ for the latter to pass under the slide R′ (see Fig. 18) back to the position in front thereof, as shown in Fig. 14, at the time the rod D′ has returned to its normal forward position. During the time the catch $R^2$ passes under the slide R′ the hooks F′ travel up the inclined side of the collar $D^3$ to finally snap against the base of the said collar $D^3$ owing to the action of the spring $F^4$ to lock the rod D′ in its normal forward position.

When the auxiliary actuating device is used to apply the brake as above set forth the ignition current for the motor of the automobile is cut out automatically and for this purpose the following arrangement is made: On the rod D′ is secured a transversely extending contact S normally in engagement with a contact S′ held insulated on the casing G (see Figs. 2, 3, 4 and 5), and the said contacts S, S′ are in the circuit wire $S^2$ of the ignition circuit provided with the usual circuit wire $S^3$ (see Figs. 21, 22 and 23). When the rod D′ moves rearwardly, as previously explained, the contact S moves out of engagement with the contact S′ (see Figs. 4 and 5) whereby the ignition circuit is broken and ignition in the motor ceases to eventually bring the latter to a standstill.

The circuit wire $S^2$ is provided with branch wires $S^4$, $S^5$ connected with contacts T, T′ held insulated on the shaft U of the speed changing device of the automobile, the said shaft U being provided with the usual change speed lever U′ under the control of the chauffeur (see Figs. 1 and 21). The contacts T and T′ are in engagement with the segmental contacts $T^2$, $T^3$ connected by wires $S^6$, $S^7$ with contacts $T^4$, $T^5$ held insulated on the front face of the locking member I. The contacts $T^4$, $T^5$ are adapted to engage a contact $T^6$ connected with the circuit wire $S^3$. It will be noticed that when the locking member I is in locking position the contact member $T^4$ is in engagement with the fixed contact $T^6$, as shown in Fig. 23, and when the locking member I is moved forward into withdrawn position then the contact $T^4$ is out of engagement with the fixed contact $T^6$ and the other contact $T^5$ moved into engagement with the contact $T^6$, as shown in Fig. 22. When the change speed lever U′ is in neutral position then the several parts are in the position shown in Fig. 22, that is, the circuit is closed by way of the contacts S, S′, the contacts T′, $T^3$ and the contacts $T^5$, $T^6$. When the change speed lever is shifted to active position, as shown in Fig. 23, then the ignition circuit is closed by way of the contacts S, S′, T, $T^2$ and $T^4$, $T^6$, but in either case the circuit is broken whenever the rod D′ is moved rearwardly to apply the brake and to move the contact S out of engagement with the contact S′.

From the foregoing it will be noticed that the ignition circuit is broken by the auxiliary actuating device when the latter is actuated and hence the latter forms a check for the chauffeur. It will also be noticed that when the lever U′ is in neutral position and the rim $J^4$ is released by the chauffeur the ignition circuit is closed and the motor can be started, and when the rim $J^4$ is pressed downward the circuit remains closed. When the chauffeur now moves the lever U′ into active position, the circuit remains closed and the automobile is propelled, but as soon as the chauffeur releases the rim $J^4$ the circuit is interrupted and the motor is stopped. Thus the chauffeur must keep the rim $J^4$ pressed if the automobile is to be propelled.

Having thus described my invention, I claim as new and desire to secure by Letters Patent:

1. In an automobile, the combination of the usual brake mechanism, an auxiliary actuating device for the said brake mechanism and under the control of the occupant of a rear seat of the automobile, and a locking device under the control of the chauffeur and adapted to engage the auxiliary actuating mechanism to normally hold the latter locked against operation.

2. In an automobile, the combination of the usual brake mechanism, an auxiliary actuating device for the said brake mechanism and under the control of an occupant of a rear seat, and a locking device for the said auxiliary actuating device and having a spring-pressed member under the control of the chauffeur, the said spring-pressed member when released actuating the said locking device to unlock the auxiliary actuating device.

3. In an automobile, the combination of the usual brake mechanism, an auxiliary actuating device for the said brake mechanism and under the control of an occupant of a rear seat of the automobile, a locking device under the control of the chauffeur and adapted to engage the said auxiliary actuating mechanism to normally hold the latter locked against operation, and an emergency application device connected with the said auxiliary actuating device to permit applying the brakes when the said locking device is in locking position.

4. In an automobile, the combination of the usual brake mechanism, an auxiliary actuating device for the said brake mechanism and under the control of an occupant of a rear seat, a locking device under the control of the chauffeur and adapted to engage the auxiliary actuating device to normally hold the latter locked against operation, and an electric switch controlled by the said auxiliary actuating device and arranged in the ignition circuit of the automobile motor to stop the motor on applying the brakes through the agency of the said auxiliary actuating device.

5. In an automobile, the combination of the usual brake mechanism, an auxiliary actuating device for the said brake mechanism and under the control of an occupant of a rear seat, and a locking device for the said auxiliary actuating device and having a spring-pressed controlling member in the form of a rim arranged adjacent to the rim of the steering wheel to be grasped with the latter by the chauffeur.

6. In an automobile, the combination of the usual brake mechanism, the usual steering mechanism having a steering wheel provided with a recessed rim, an auxiliary actuating mechanism for the said brake mechanism, and under the control of an occupant of a rear seat, and a locking device for the said auxiliary actuating mechanism and having a spring-pressed controlling member in the form of a controlling rim adapted to be seated in the recess of the said steering wheel rim, the said controlling rim being normally out of the said recess.

7. An auxiliary actuating device for the brake mechanism of an automobile, comprising a spring-pressed rod provided with a collar, a lever connecting the said rod with the brake rod of the brake mechanism, a pair of retaining levers having hooks adapted to engage the said collar to hold the latter against the tension of its spring, a pair of opening levers for engaging the said retaining levers to swing the latter into open position, manually-controlled means under the control of a passenger for actuating the said opening levers, and a locking device under the control of the chauffeur for locking the said opening levers against movement.

8. An auxiliary actuating device for the usual brake mechanism of an automobile, comprising a lever connected with the brake rod of the said brake mechanism, an operating rod mounted to slide and connected with the said lever, a spring device connected with the said rod, a retaining device connected with the said rod for normally holding the said rod in retracted position and the said spring device under tension, an operating device for the said retaining device and under the control of a passenger, and a locking device for the said retaining device and under the control of the chauffeur.

9. An auxiliary actuating device for the usual brake mechanism of an automobile, comprising a lever connected with the brake rod of the said brake mechanism, an operating rod mounted to slide and connected with the said lever, a spring device connected with the said rod, a retaining device connected with the said rod for normally holding the said rod in retracted position and the said spring device under tension, an operating device for the said retaining device and under the control of a passenger, and a locking device for the said retaining device and provided with a rim adapted to be seated on the steering wheel of the automobile and provided with a spring for normally holding the said rim off its seat on the steering wheel.

10. An auxiliary actuating device for the brake mechanism of an automobile, comprising a spring-pressed rod provided with a collar, a lever connecting the said rod with the brake rod of the brake mechanism, a pair of retaining levers having hooks adapted to engage the said collar to hold the latter against the tension of its spring, a pair of opening levers for engaging the said retaining levers to swing the latter into open position, manually-controlled means under the control of a passenger for actuating the said opening levers, a locking device under the control of the chauffeur for locking the said opening levers against movement, and an emergency application device connected with the said manually-controlled means to allow of actuating the latter when the said opening levers are locked.

11. An auxiliary actuating device for the usual brake mechanism of an automobile, comprising a main lever connected with the said brake mechanism, a slidable operating rod connected with the said brake lever, a spring device connected with the said lever, a cone-shaped collar held on the said rod, retaining levers having hooks adapted to engage the said collar to hold the said spring device normally under tension, a pair of opening levers adapted to open the said retaining levers for the latter to release the said collar, a slide, links connecting the said slide with the said opening levers, and a manually-controlled operating lever connected with the said slide.

12. An auxiliary actuating device for the usual brake mechanism of an automobile, comprising a main lever connected with the said brake mechanism, a slidable operating rod connected with the said brake lever, a spring device connected with the said lever, a cone-shaped collar held on the said rod, retaining levers having hooks adapted to engage the said collar to hold the said spring device normally under tension, a pair of opening levers adapted to open the said retaining levers for the latter to release the said collar, a slide, links connecting the said slide with the said opening levers, a bell crank lever connected with the said slide, an operating lever, and a link connecting the said bell crank lever with the said operating lever.

13. An auxiliary actuating device for the usual brake mechanism of an automobile, comprising a main lever connected with the said brake mechanism, a slidable operating rod connected with the said brake lever, a spring device connected with the said lever, a cone-shaped collar held on the said rod, retaining levers having hooks adapted to engage the said collar to hold the said spring device normally under tension, a pair of opening levers adapted to open the said retaining levers for the latter to release the said collar, a slide, links connecting the said slide with the said opening levers, a manually-controlled operating lever connected with the said slide, a slidable locking member adapted to engage the said opening levers to normally lock the same against movement, a spring-pressed sleeve slidable in the hollow shaft of the steering wheel of the automobile, a connection between the said sleeve and the said locking member, and a controlling wheel having a hub and a rim, the hub engaging the said sleeve and the said rim being in close proximity to the rim of the steering wheel normally held spaced therefrom, the said controlling wheel when moved against the steering wheel causing said locking member to disengage and unlock the said opening levers.

14. An auxiliary actuating device for the usual brake mechanism of an automobile, comprising a main lever connected with the said brake mechanism, a slidable operating rod connected with the said brake lever, a spring device connected with the said lever, a cone-shaped collar held on the said rod, retaining levers having hooks adapted to engage the said collar to hold the said spring device normally under tension, a pair of opening levers adapted to open the said retaining levers for the latter to release the said collar, a slide having a longitudinal slot, a pair of links connected with the said opening levers and having a common pivot engaging the said slide slot, a second pair of links connected with the said retaining levers and having a common pivot engaging the said slide slot, an operating lever connected with the said slide, a bolt under the control of a passenger and engaging the said operating lever to lock the latter against movement in one direction and to allow movement of the operating lever in the opposite direction, and a locking device under the control of the chauffeur engaging the said opening levers.

15. An auxiliary actuating device for the usual brake mechanism of an automobile, comprising a main lever connected with the said brake mechanism, a slidable operating rod connected with the said brake lever, a spring device connected with the said lever, a cone-shaped collar held on the said rod, retaining levers having hooks adapted to engage the said collar to hold the said spring device normally under tension, a pair of operating levers adapted to open the said retaining levers for the latter to release the said collar, a slide, links connecting the said slide with the said opening levers, a manually-controlled operating lever connected with the said slide, and a locking device for the said operating levers and under the control of the chauffeur, the said locking device when released by the chauffeur being in unlocking position.

16. An auxiliary actuating device for the usual brake mechanism of an automobile, comprising a main lever connected with the said brake mechanism, a slidable operating rod connected with the said brake lever, a spring device connected with the said main lever, a cone-shaped collar held on the said rod, retaining levers having hooks adapted to engage the said collar, a slide, links connecting the said slide with the said retaining levers, and an operating lever under the control of a passenger and connected with the said slide.

17. An auxiliary actuating device for the usual brake mechanism of an automobile, comprising a main lever connected with the said brake mechanism, a slidable operating rod connected with the said brake lever, a spring device connected with the said main lever, a cone-shaped collar held on the said rod, retaining levers having hooks adapted to engage the said collar, a slide, links connecting the said slide with the said retaining levers, an operating lever under the control of a passenger and connected with the said slide, and a locking device having a key-controlled bolt normally locking the said operating lever against movement in one direction.

18. An auxiliary actuating device for the usual brake mechanism of an automobile, comprising a main lever connected with the said brake mechanism, a slidable operating rod connected with the usual brake lever, a spring device connected with the said main lever, a cone-shaped collar held on the said rod, retaining levers having hooks adapted to engage the said collar, a slide, links connecting the said slide with the said retaining levers, an operating lever under the control of a passenger and connected with the said slide, a locking device having a key-controlled bolt normally locking the said operating lever against movement in one direction, and a second locking device controlled by the said bolt and adapted to lock the said operated lever against return movement.

19. An auxiliary actuating device for the usual brake mechanism of an automobile, comprising a main lever connected with the said brake mechanism, a slidable operating rod connected with the said brake lever, a spring device connected with the said main lever, a cone-shaped collar held on the said rod, retaining levers having hooks adapted to engage the said collar, a slide, links connecting the said slide with the said retaining levers, an operating lever under the control of a passenger and connected with the said slide, a locking device having a key-controlled bolt normally locking the said operating lever against movement in one direction, a second locking device having a spring-pressed bolt mounted to slide and to turn, and an actuating connection between the said bolts.

20. An auxiliary actuating device for the brake mechanism of an automobile, comprising a spring-pressed rod provided with a collar, a lever connecting the said rod with the brake rod of the brake mechanism, a pair of retaining levers having hooks adapted to engage the said collar to hold the latter against the tension of its spring, a pair of opening levers for engaging the said retaining levers to swing the latter into open position, manually-controlled means under the control of a passenger for actuating the said opening levers, a locking device under the control of the chauffeur for locking the said opening levers against movement, and a locking lever connected with the said brake mechanism and adapted to engage and lock the said controlling means at the time the said locking device unlocks the said opening levers.

21. An auxiliary actuating device for the usual brake mechanism of an automobile, comprising a main lever connected with the said brake mechanism, a slidable operating rod conected with the said brake lever, a spring device connected with the said main lever, a cone-shaped collar held on the said rod, retaining levers having hooks adapted to engage the said collar, a slide, links connecting the said slide with the said retaining levers, a spring-pressed latch on the said rod and adapted to engage the said slide, and a fixed tripping pin for the said latch.

22. In an automobile, the combination of a change gear shaft provided with insulated contact arms, fixed contacts adapted to be engaged by the said contact arms, an ignition circuit electrically connected with the said contact arms and their contacts, a double switch in the said circuit and controlled by the chauffeur the said double switch being connected with the said fixed contacts, a regular brake mechanism under the control of the chauffeur, and under the control of an occupant of a rear seat of the automobile, the said auxiliary actuating device being an auxiliary actuating device for the said brake mechanism and provided with an electric circuit closer in the said ignition circuit.

In testimony whereof I have signed my name to this specification in the presence of two subscribing witnesses.

EDWARD A. DIETERICH.

Witnesses:
JOHN SEELIG,
WALTER L. WILSON.